United States Patent Office 3,509,159
Patented Apr. 28, 1970

3,509,159
PREPARATION OF 8-MERCAPTOQUINO-
LINES FROM THIOUREA AND 8-AMINO-
QUINOLINE
David Kealey, Pitman, N.J.
(Chale, New Road, Twyford, Berkshire, England)
No Drawing. Filed July 5, 1966, Ser. No. 562,455
Int. Cl. C07d 33/62
U.S. Cl. 260—289                                    4 Claims

ABSTRACT OF THE DISCLOSURE

A technique for the preparation of 8-mercaptoquinoline and its derivatives which utilizes as a starting material an 8-aminoquinoline, the 8-aminoquinoline being treated so as to form its corresponding diazo salt; thereafter, the intermediate diazo salt product is reacted with a mercaptan forming reagent, preferably thiourea, and the 8-mercaptoquinoline is thereafter separated from the reactant mixture.

The present invention relates generally to the preparation of 8-mercaptoquinoline and its derivatives, and more particularly to an improved process for the preparation of this material wherein the starting material is preferably an 8-aminoquinoline, and wherein this material is formed into its diazo salt, the mercaptan being formed by a substitution reaction of the diazo salt with a mercaptan forming reagent such as thiourea or the like.

Recently, there has been a substantial increasing interest in 8-mercaptoquinoline and its various derivatives, particularly for use as complexing agents for metals in analytical procedures. This increasing interest is manifested by the steady growth of literature reference on these various materials. At the present time, the procedures for preparing this material or its derivatives normally involve numerous stages, and result in only modest to moderate yields.[1] It has been found that these procedures are commercially expensive and therefore unacceptable for the production of these materials on an efficient basis. These costly processes and procedures have accordingly limited the use and availability of 8-mercaptoquinoline and its derivatives.

In accordance with the present invention, a technique for preparing 8-mercaptoquinoline and its derivatives is provided which is rapid, efficient, and inexpensive, and which is readily applicable to the preparation of substituted 8-mercaptoquinolines as well. Among the materials which can be prepared by this process are those 8-mercaptoquinolines having a general structural formula:

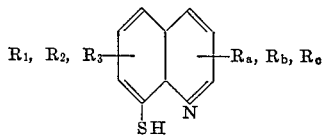

wherein $R_1$, $R_2$, $R_3$, $R_a$, $R_b$ and $R_c$ represent one of the group consisting of hydrogen, a low molecular weight alkyl group, and an alkoxy group. This material normally will accept the substituents at any location on the 8-mercaptoquinoline nucleus. The term 8-mercaptoquinoline is intended to refer to those 8-mercaptoquinolines having any of these structures indicated above as well as certain halogenated derivatives. Known halogen derivatives include 3-bromo, 5-fluoro, 5-chloro, 5-bromo, 5-iodo, 6-bromo, and 6-chloro.

In accordance with the present invention, it has been found that the diazotisation of 8-aminoquinoline and the various substituted 8-aminoquinolines yields certain diazonium salts which react with a mercaptan forming reagent,

[1] A. Edinger, Berichte (1908), 41, 937.

preferably thiourea, to yield the 8-mercaptoquinoline or the substituted 8-mercaptoquinolines. The substantially pure reactant products can normally be isolated by extraction or by conversion to the disulfides and subsequent reduction. The reaction is straightforward, and substantial yields are normally obtained in the process.

Therefore, it is an object of the present invention to provide an improved processes for preparing 8-mercaptoquinoline and its derivatives by means of the diazotisation of 8-aminoquinoline and substituted 8-aminoquinolines, this being followed by a reaction with a mercaptan forming reagent to yield 8-mercaptoquinoline or the appropriate substituted 8-mercaptoquinoline derivative.

It is yet a further object of the present invention to provide an improved technique for preparing 8-mercaptoquinoline and its derivatives by means of the diazotisation of 8-aminoquinoline or substituted 8-aminoquinolines, this being followed by a reaction of the diazonium salt with thiourea to yield 8-mercaptoquinoline or the appropriate substituted 8-mercaptoquinoline derivative.

Other and further objects of the present invention will become apparent to those skilled in the art upon a study of the following specification and appended claims.

In order to better illustrate the processes of the present invention, reference is made to the following examples which are intended to illustrate the various features:

EXAMPLE I

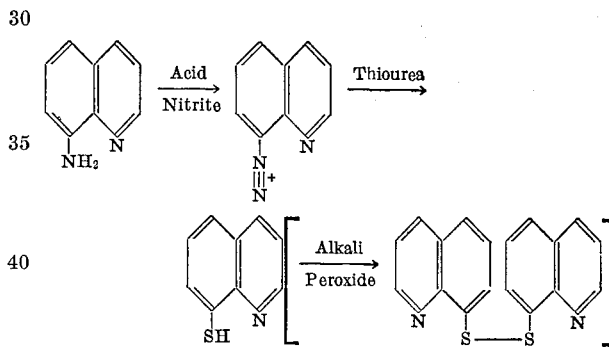

8-aminoquinoline (14.4 g., 0.1 mole) was dissolved in 48 percent hydrobromic acid (75 ml., 0.5 mole) and water (225 ml.). The solution was cooled to 0° C., and crushed ice (150 g.) was added, followed by a slight excess of aqueous sodium nitrite (10 percent w./v.). The excess of nitrite was destroyed by addition of sulfamic acid, and the diazonium solution added slowly to a warm (50° C.) solution of thiourea (9 g., 0.12 mole) in water (100 ml.). The solution was warmed and stirred until evolution of nitrogen ceased completely. The resulting solution of 8-mercaptoquinoline was treated by one of the following three procedures:

(1) The solution was made alkaline (pH 9–10), and aqueous hydrogen peroxide (3 percent v./v.) was added until precipitation of 8,8'-diquinolyl disulfide was complete. The disulfide was quantitatively reduced to 8-mercaptoquinoline by refluxing with a mixture of hypophosphorous and hydrochloric acids (1+5) for one hour. The resulting solution was neutralized to pH 4–6 when the red dihydrate of 8-mercaptoquinoline crystallized from the cooled solution. Treatment of the hydrate with concentrated aqueous sodium hydroxide yielded the hydrated sodium salt which can be further purified by recrystallization from alcohol and ether.

(2) The solution was neutralized (pH 4–6) and 8-mercaptaquinoline extracted as the anhydrous mercaptan into diethyl ether. The ether solution was treated with aqueous or alcoholic sodium hydroxide to yield the sodium salt of the mercaptan.

(3) The solution was concentrated by evaporation, and neutralized with concentrated aqueous sodium hydroxide to yield the sodium salt of 8-mercaptoquinoline directly. A yield of 50–70 percent was obtained.

EXAMPLE II

The processes of Example I were repeated but using 2-methyl-8-aminoquinoline in place of 8-aminoquinoline. A yield of over 90 percent was obtained.

EXAMPLE III

The processes of Example I were repeated but using 6-methoxy-8-aminoquinoline in place of 8-aminoquinoline. A yield of 20–30 percent was obtained.

Conventional diazotisation techniques are utilized in the initial treatment of the 8-aminoquinoline. The particular diazotisation step is not critical, and any technique which will yield the diazonium salt may be employed.

The mercaptan forming reagent is preferably thiourea. This is a well-known mercaptan forming reactant and is normally preferred because of the fact that no alkyl sulfide is normally formed as a by-product. Of course, if appropriate separation techniques may be employed, other mercaptan forming reagents may be employed.

The 8-mercaptoquinolines of the present invention may employ low molecular weight alkyl groups in various positions on the mercaptoquinoline nucleus. While short chain alkyl groups containing from 1–4 carbon atoms can be normally accommodated, the low-molecular weight alkyl group such as a methyl group or an ethyl group will normally be most readily accommodated. As an alkoxy group, it is generally observed that the methoxy or ethoxy groups are most readily accommodated about the mercaptoquinoline nucleus.

As indicated in the various examples, the corresponding 8,8'-diquinolyl disulfide and its derivatives are formed in the separation reaction. If desired, these materials may be obtained as a product in accordance with the process of the present invention, whenever desired.

The halogen derivatives act in the same general manner as those materials set forth in the above examples, and the diazonium salts may be somewhat more stable due to the electron withrawing effect of the halogen atom. Thus, while the above reaction conditions are generally satisfactory, somewhat more vigorous conditions may enhance the reaction rate and the yield. Accordingly slightly higher temperatures, higher concentrations of thiourea, or higher pH may be employed.

I claim:
1. The method of preparing an 8-mercaptoquinoline having a structural formula:

wherein $R_1$, $R_2$, $R_3$, $R_a$, $R_b$ and $R_c$ represent one of the group consisting of hydrogen, a halogen, a low-molecular weight alkyl group having from 1 to 4 carbon atoms and an alkoxy group selected from the group consisting of a methoxy and an ethoxy radical, which method comprises preparing the diazonium salt of an 8-aminoquinoline and thereafter adding said diazonium salt to an aqueous solution of thiourea to form a reactant product of the corresponding 8-mercaptoquinoline by substitution with the diazonium salt, and thereafter separating the reactant product from the solution.

2. The method as set forth in claim 1 being particularly characterized in that the 8-aminoquinoline is 8-aminoquinoline.

3. The method as set forth in claim 1 being particularly characterized in that the 8-aminoquinoline is 2-methyl-8-aminoquinoline.

4. The method as set forth in claim 1 being particularly characterized in that the 8-aminoquinoline is 6-methoxy-8-aminoquinoline.

References Cited

UNITED STATES PATENTS

| | | | |
|---|---|---|---|
| 2,381,082 | 8/1945 | Shinkle | 260—283 X |
| 2,430,678 | 11/1947 | Jenkins et al. | 260—288 |
| 2,430,679 | 11/1947 | Jenkins et al. | 260—288 |
| 3,033,875 | 5/1962 | Nutting et al. | 260—288 X |
| 3,121,725 | 2/1964 | Schnitzer | 260—288 X |
| 3,218,309 | 11/1965 | Elslager | 260—288 X |
| 3,301,859 | 1/1967 | Cheney et al. | 260—288 X |
| 1,706,489 | 3/1929 | Hoffa et al. | 260—609 |
| 2,438,838 | 3/1948 | Ballard et al. | 260—609 |
| 2,490,257 | 12/1949 | Crowley et al. | 260—609 |
| 3,047,632 | 7/1962 | Harbort | 260—609 |
| 3,235,597 | 2/1966 | Mills et al. | 260—609 X |
| 3,415,889 | 10/1968 | Louthan | 260—552 X |

DONALD G. DAVIS, Primary Examiner

U.S. Cl. X.R.

260—288, 283, 141, 552, 609, 270